United States Patent [19]

Kaye

[11] 4,186,983

[45] Feb. 5, 1980

[54] BATTERY CONNECTOR

[75] Inventor: Gordon E. Kaye, Garrison, N.Y.

[73] Assignee: P. R. Mallory & Co. Inc., Indianapolis, Ind.

[21] Appl. No.: 956,130

[22] Filed: Oct. 30, 1978

[51] Int. Cl.² .................. H01M 2/20; H01R 13/54
[52] U.S. Cl. .................. 339/91 R; 339/152; 429/97
[58] Field of Search .......... 339/91 R, 152, 75 M, 339/224, 228, 59 R, 102 R; 429/98–100, 170, 178; D13/4, 5, 6, 8, 10

[56] References Cited

U.S. PATENT DOCUMENTS

| 1,014,025 | 1/1912 | Rawson et al. ............... 339/152 |
| 2,590,804 | 3/1952 | Vitale ............................ 429/97 |
| 2,818,463 | 12/1957 | Parker ........................... 429/99 |
| 3,181,974 | 5/1965 | Barbera ......................... 339/152 |
| 3,796,984 | 3/1974 | Seunko ........................ 339/152 X |
| 4,020,245 | 4/1977 | Mabucai et al. ............... 429/100 |

FOREIGN PATENT DOCUMENTS 626561  6/1949  United Kingdom .................. 429/98

Primary Examiner—Eugene F. Desmond
Attorney, Agent, or Firm—Ronald S. Cornell; Israel Nissenbaum; Martin M. Glazer

[57] ABSTRACT

A connector for use in electrically connecting a battery, having substantially planar terminals on a wall thereof, to an electrical device. The connector comprises a housing partially containing conductive means which extend from the housing to contact the battery terminals and the electrical device. The connector further includes resilient gripping means on the housing which cooperatively engages holding means on the battery with a snap on connection.

9 Claims, 15 Drawing Figures

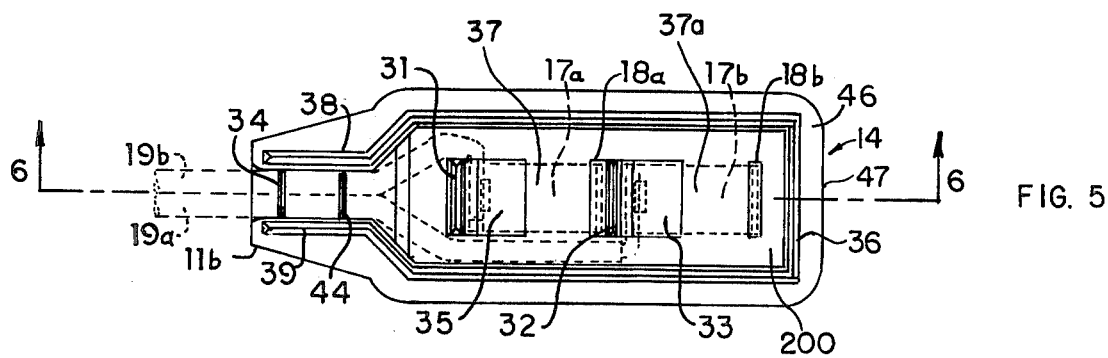

BATTERY CONNECTOR

This invention relates to connectors which mechanically hold and electrically connect batteries to electrical devices. More particularly this invention relates to connectors for use with batteries having planar terminals such as those described in U.S. Pat. Nos. Des. 243,615; 243,616; 243,617, and 243,618.

Several types of connectors, which electrically connect a battery to an electrical device and which mechanically hold the battery, have been used in the past. The most typical of such connectors is adapted for use with the common cylindrical battery having opposing terminals at the end walls thereof. Such battery connectors generally have a cradle or bracket configuration whereby they substantially enclose the entire battery in order that both terminals be electrically contacted. As a result cradle or bracket connectors are generally bulky and they are usually integral with the electrical devices in order to minimize excessive volume utilization.

Another type of battery connector uses the cooperative association of the battery terminals and the terminal contacting members of the connector to provide mechanical as well as electrical connection. An example of such battery connector is a cable with a plug which is inserted into an associated battery having socket terminals. Another of such type of battery connector is one which is used with the common rectangular 9 volt battery having extending male and female terminals. The connector used therewith has extending male and female members which are snap fitted to the female and male terminals respectively of the associated battery. Though such connectors are relatively compact they have several shortcomings. Since the terminals or terminal contacting members themselves provide the mechanical connection, mechanical stress placed upon the relatively small terminals or terminal contacting members may result in mechanical disengagement, by breakage or relaxation of the male/female connection, with lost electrical connection. Furthermore, since these connectors can only be used when the terminals have either male or female configurations, batteries having asexual planar terminals, such as those in the aforementioned design patents, cannot be used therewith. Additionally, the 9 volt connector allows exposed terminal connections whereby detrimental short circuiting becomes a distinct possibility.

It is an object of the present invention to provide a compact snap-on battery connector for use with a battery having cooperative holding means and substantially planar terminals on a wall thereof whereby an electrical device connected with said connector may be powered by the connected battery.

This and other objects, features and advantages of the present invention will be more clearly seen from the following description as well as the drawings in which:

FIG. 5 is a top plan view of the lower portion of the battery connector;

FIG. 6 is a cross section taken along line 6—6 of FIG. 5;

FIG. 6a is a front end view taken along line 6a—6a of FIG. 6;

FIG. 6b is a cross section view taken along line 6b—6b of FIG. 6;

FIG. 6c is a rear end view taken along line 6c—6c of FIG. 6;

FIG. 7 is a bottom plan view of the lower portion of the battery connector;

Generally the present invention comprises a compact connector for electrical connection between a battery having substantially planar terminals on a wall thereof and an electrical device. The connector comprises a housing which partially contains the conductive connection between the battery and the electrical device. Conductive terminal contacting members extend from a region of the connector housing directly adjacent to the terminal wall of the battery, when the battery is connected to the connector, and conductively contact the battery terminals. The conductive contacting members are electrically engaged to conductive wires, or the like, within the connector housing. The conductive wires extend from the housing to an electrical device whereby full electrical connection between battery and electrical device is effected. The connector, in order to maintain the electrical connection, grips the battery with resilient members which are supported from the housing of the connector. The resilient members snap over the terminal wall of the battery and cooperatively grip corresponding members on the battery located adjacent to the periphery of the terminal wall of the battery.

Preferably the connector further includes fulcrum means such as an extension of the connector housing whereby the connector may be easily removed from the battery.

Figure 1:
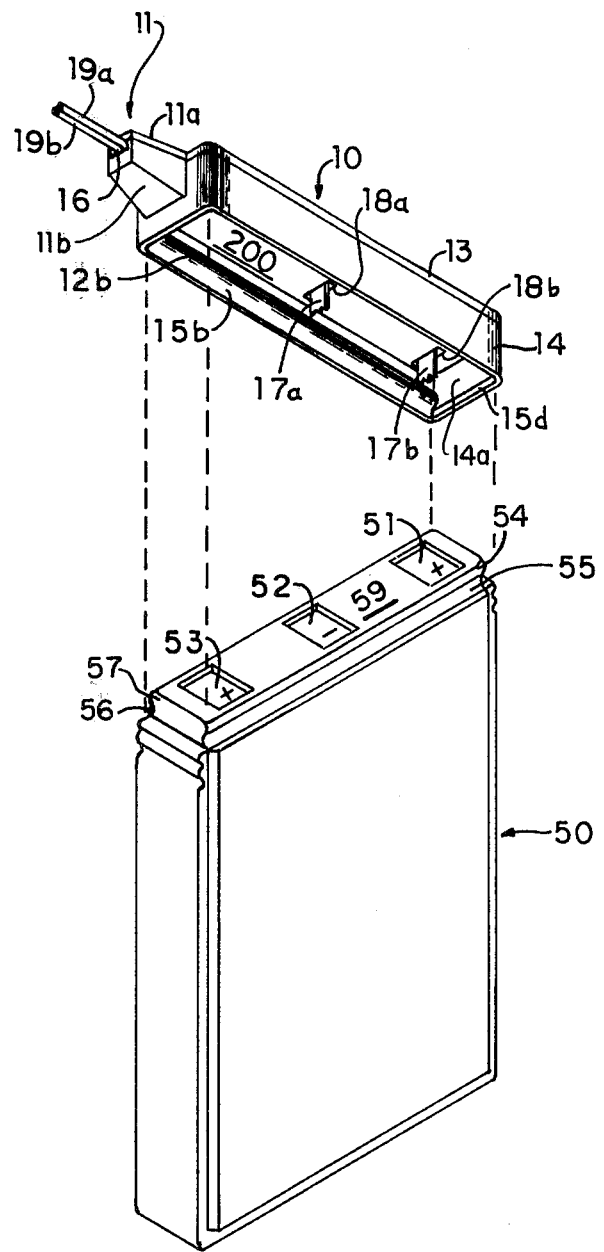
FIG. 1 is an isometric view of the battery connector of the present invention while being removed from or placed onto a battery.

Referring now to the drawings, FIG. 1 shows a connector 10 made in accordance with the present invention, which is electrically connected to an electrical device (not shown) by conductive wires 19a and 19b. The connector 10 is comprised of upper and lower portions 13 and 14 respectively which form a housing having aperture 16 through which the conductive wires 19a and 19b, contained within the housing partially extend for connection to the electrical device. The housing further partially contains conductive terminal contacting members 17a and 17b with such members electrically engaging wires 19b and 19a respectively within the housing. Terminal contacting members 17a and 17b partially extend from the housing through apertures 18a and 18b respectively in floor section 200 of lower portion 14. When battery 50 and connector 10 are connected, as shown, floor section 200 is directly adjacent the terminal wall 59 of the battery 50 with apertures 18a and 18b being directly adjacent battery terminals 52 and 51 respectively. Terminal contacting members 17a and 17b extending through apertures 18a and 18b electrically contact battery terminals 52 and 51 respectively whereby full electrical continuity between battery 50 and the electrical device is effected.

Integral with upper and lower portions 13 and 14 of connector 10 are protruding portions 11a and 11b respectively which, when connector 10 is connected to a battery, protrude beyond the plane of a side wall of the battery. Protruding portions 11a and 11b are cofitting and when mated form extension member 11, having aperture 16, from which conductive wires 19a and 19b extend. Extension member 11, because it protrudes beyond the plane of the side of the battery, functions as a fulcrum to provide leverage whereby battery connector 10 may be easily removed from the battery by digital pressure on the lower surface of protruding portion 11b. Though in the present embodiment extension member 11 operates as a fulcrum for ease in removal of the connector other means for ease in removal are possible. Examples of other removal means include knurled surfaces and indentations on the connector's outer surface which allow for greater digital manipulation.

Lower portion 14, of battery connector 10, includes peripheral skirt section 14a which engages and holds the terminal wall 59 of battery 50 therein. Opposing elongated beads 12b and 12a, (more clearly seen in FIGS. 6b and 7) on the interior wall of skirt section 14a, during engagement of the battery connector with the battery, snap over beads 57 and 54 respectively on the housing of the battery 50 and are securely held thereafter within groove regions 56 and 55. Bevelled edges 15a-d at the peripheral ends of skirt section 14a guide the terminal end of battery 50 into said skirt section 14a for proper engagement. External short circuiting is also prevented by said skirt section.

Though connector 10 is shown in FIG. 1 as providing electrical engagement with battery terminals 51 and 52, the connector may, because of the symmetry of the terminals, engage terminals 53 (of the same polarity as terminal 51) and 52 if the connector is reversed. Correct polarity is maintained with terminal contacting member 17a of the connector 10 always being associated with central battery terminal 52. Should battery 50 have but two terminals, proper polar engagement should be observed (incorrect engagement will not be detrimental to either the battery or the electrical device but will simply be non-operational).

Figure 2:
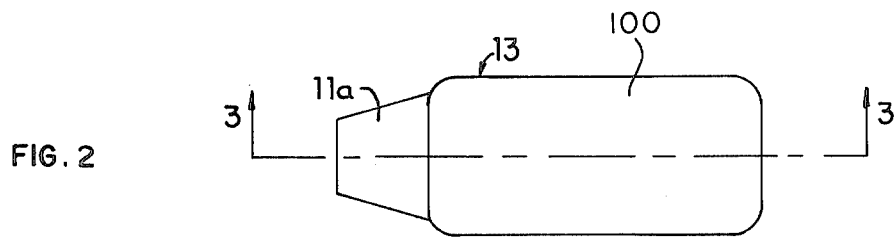
FIG. 2 is a top plan view of the upper portion of the connector housing.
Figure 3:
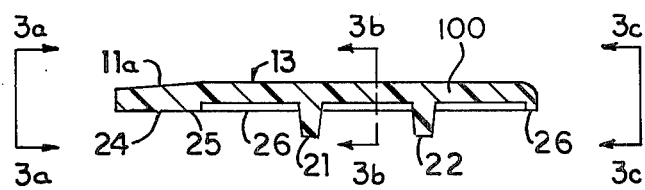
FIG. 3 is a cross section taken along line 3—3 of FIG. 2.
Figure 4:
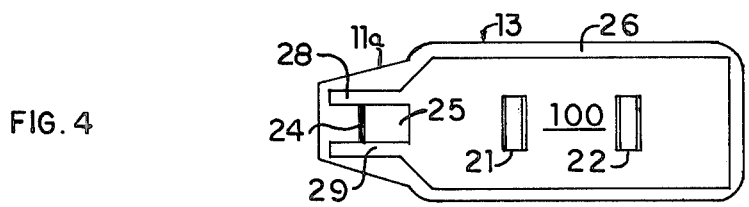
FIG. 4 is a bottom plan view of the upper portion of the battery connector.

In referring to the interior configuration of battery connector 10 in greater detail, FIGS. 2-4 depict the configuration of upper portion 13 and FIGS. 5-7 depict the configuration of lower portion 14.

Upper portion 13 is comprised of cover plate 100 having a generally rectangular shape roughly corresponding to the areal dimensions of the terminal end of an associated battery. Integral with cover plate 100 at one thereof is tapering protruding portion 11a. Also integral with cover plate 100 are downwardly extending perpendicular members 21 and 22 and peripheral raised rim 26 which circumscribes the perimeter of cover plate 100 and protruding portion 11a. The lower surface of protruding portion 11a includes raised rectangular plateau area 25 with transverse ridge 24 thereon and channels 28 and 29 which are defined between raised rim 26 and two sides of plateau area 25.

Lower portion 14 is comprised of rectangular floor section 200, of similar areal dimensions as cover plate 100, with apertures 18a and 18b therein. Skirt section 14a integrally depends from the lower surface of floor section 200 around its periphery and is sized to accommodate a connected battery. Integral with floor section 200 at an end thereof is tapering protruding portion 11b. Also integral with floor section 200 are upwardly extending perpendicular members 31 and 32 and peripheral raised rim 47. Rectangular depressed regions 35 and 33 in the upper surface of floor secton 200, are adjacent the rears of members 31 and 32 respectively. Areas 37 and 37a separate depressed regions 35 and 33 and apertures 18a and 18b. Peripheral raised rim 47 substantially circumscribes the perimeter of floor section 200 and protruding portion 11b with an interruption at the tapered end of portion 11b. Raised rim 47 includes ridge 36 thereon which is set back from the outer edge of said rim by ledge 46 and which substantially extends along the entire length of said rim. The upper surface of protruding portion 11b includes raised plateau area 45 defined within and spanning the interruption of raised rim 47. Ridges 34 and 44 span plateau area 45 across said interruption.

Figure 8:
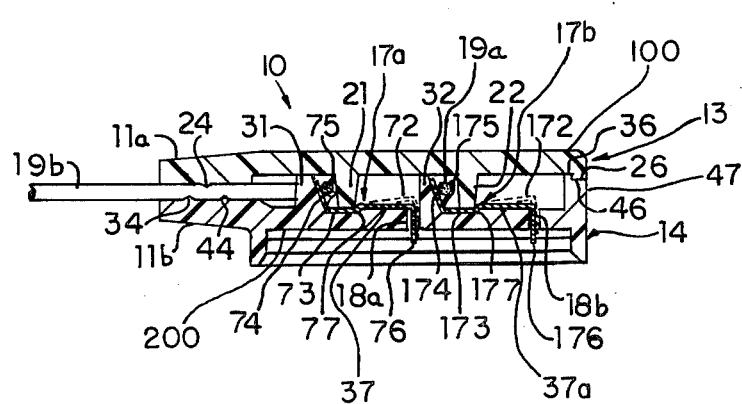
FIG. 8 is a vertical sectional view taken through the center of the battery connector portions of FIGS. 3 and 6 in final assembly and with internal components in place.

Upper and lower portions 13 and 14 of battery connector 10 in FIGS. 3 and 6 (cross sectional views) are cooperatively associated or mated as shown in the cross sectional view of the completed connector in FIG. 8. A housing is formed by such mating with the upper portion 13, shown in FIGS. 2-4, as a cover for lower portion 14, shown in FIGS. 5-7. The housing fixedly contains conductive terminal contacting members 17a and 17b electrically engaged with conductive wires 19b and 19a.

Terminal contacting members 17a and 17b are of identical construction but with associated conductive wires 19b and 19a connected therewith respectively from opposite sides as shown in phantom in FIG. 5.

Figure 9:
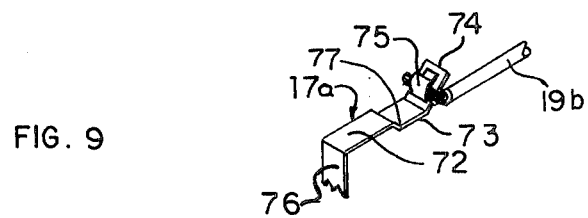
FIG. 9 is an isometric view of one of the terminal engaging members shown in FIG. 8.

In FIG. 9, terminal contacting member 17a (or equivalent member 17b) shown removed from connector 10, comprises a unitary metal strip having downwardly extending portion 76 (176), with serrated edge, for contact with a terminal of a connected battery. Plateau area 72 (172) is set at a right angle to portion 76(176) with plateau area 72(172) descending into lower plateau area 73(173) via small angled connection 77(177). Lower plateau area 73(173) thereafter extends into oppositely angled rear flange section 74(174) having a cantilevered cutout 75(175) for fixedly retaining wire 19b (19a) therebetween.

As seen in FIG. 8 terminal contacting members 17a and 17b are seated on lower connector portion 14 with flange sections 74 and 174 thereof respectively buttressed against upwardly extending members 31 and 32 of lower portion 14. Lower plateaus 73 and 173 of member 17a and 17b fit into rectangular depressed regions 35 and 33 of lower portion 14 (FIGS. 5 and 6). Plateau areas 37 and 37a of lower portion 14 (FIG. 6) support plateau areas 72 and 172 of terminal contacting members 17a and 17b respectively. Downwardly extending portions 76 and 176 of contacting member 17a and 17b) extend through apertures 18a and 18b respectively in lower portion 14 for electrical contact with terminals of a connected battery. The upward movement of downwardly extending portions 76 and 176 and plateau areas 72 and 172, when a battery is connected therewith is indicated by the dotted lines in FIG. 8. Angled connections 77 and 177 of members 17a and 17b respectively serve as fulcrums about which plateaus 72 and 172 and downwardly extending portions 76 and 176 can rotate upwardly. Such upward movement is arrested when downwardly extending portions 76 and 176 contact the peripheral edges of apertures 18a and 18b in floor section 200. With further movement restricted positive contact with the battery is thereby achieved.

Figures 3A, 3B, 3C:
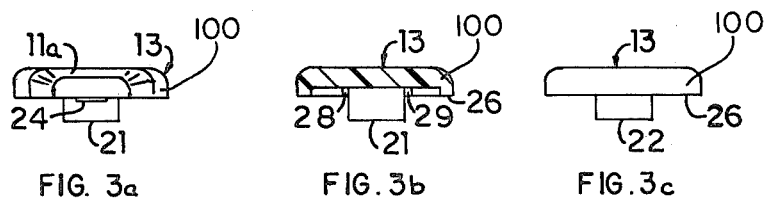
FIG. 3a is a front end view taken along line 3a—3a of FIG. 3.
FIG. 3b is a cross section taken along line 3b—3b of FIG. 3.
FIG. 3c is a rear end view taken along line 3c—3c of FIG. 3.

In FIG. 8, the completed connector 10 comprises upper and lower portions 13 and 14 mated by cooperatively associated members thereof. Thus, peripheral raised rim 26 of upper portion 13 fits into peripheral ledge 46 of lower portion 14 with ridge 36 vertically engaging the inner region defined by peripheral raised rim 26. End sections 28 and 39 of ridge 36 fit within channels 29 and 28 of lower portion 14. Downwardly extending members 21 and 22 of upper portion 13 extend to rectangular depressed regions 35 and 33 of lower portion 14 (FIGS. 5 and 6) respectively and compress terminal contacting members 17a and 17b against the bottom walls of such regions respectively. Upwardly extending members 31 and 32 (FIGS. 5, 6a-b) of lower portion 14 fit flush against the inner surface of cover member 100 (FIG. 4) to provide enclosed areas between members 31, 21 and 32, 22. Conductive wires 19a and 19b (shown in phantom in FIG. 5) are held and buttressed within said enclosed areas by terminal contacting members 17a and 17b respectively between cantilevered cut-outs 75 and 175 are rear angled flanges 74 and 174 respectively thereof. Ridge 24 on plateau 25 of protruding portion 11a (FIGS. 3, 3a, and 4) and ridges 34 and 44 on protruding portion 11b (FIGS. 5,6,6a) serve to compressively hold conductive wires 19a and 19b in place. When upper and lower portions 13 and 14 are cooperatively associated as in FIG. 8, the beads shown atop ridge 36 and extending members 32 and 31, of lower portion 14 (FIGS. 5,6,6a-c) are ultrasonically sealed against the associated surfaces of upper section 13 to provide a sealed connector. Ridges 24,34, and 44 are also thereby ultrasonically sealed to the insulation of wires 19a and 19b to effect greater stationary holding of said wires. Though ultrasonic sealing is preferred, other methods of sealing such as heat sealing and mechanical connections may also be utilized.

Materials used in constructing the battery connector housing are generally those having insulative and sealing properties with the battery gripping members thereof also having a degree of resiliency whereby a snap connection with a battery is possible. Examples of materials having the requisite properties including resiliency include plastics such as ABS, polypropylene, polyethylene, nylon, polystyrene, and the like.

The most useful material for the terminal contacting members is nickel plated steel because of its structural strength and resiliency. However, other metals, such as phosphorus bronze, beryllium copper, and stainless steel may be used as well.

The foregoing embodiment is presented for the purpose of illustrating the invention and its attendant advantages. It is understood that changes and variations in structure can be made without departing from the scope of the present invention as defined in the following claims.

What is claimed is:

1. A connector, adapted to be connected to a battery having substantially planar terminals on a wall thereof and to an electrical device to provide electrical connection between said electrical device and said battery; said connector comprises a housing and conductive means adapted to electrically contact said battery terminals and said electrical device, said conductive means being partially contained within said housing and partially extending from said housing for electrical connection to said electrical device and said conductive means further partially extending from said housing at a region of said housing adapted to be directly adjacent said battery wall when said connector is connected to said battery, said connector further comprising resilient connection means to grip said battery, said connection means extending from the periphery of said housing region with said connection means being adapted to snap over said battery wall and cooperatively grip corresponding holding means on said battery with said holding means being located adjacent to the periphery of said battery wall.

2. The connector of claim 1 wherein said conductive means comprises two conductive wires electrically and mechanically connected to two conductive metallic strips respectively within said housing wherein said conductive wires partially extend from said housing for connection with said electrical device and wherein said metallic strips partially extend from said housing for resilient electrical contact with said battery terminals.

3. The connector of claim 2 wherein said housing further includes two opposing surfaces therein with at least one ridge on said surfaces with said conductive wires extending between said surfaces in a direction transverse to said ridge and being fixedly held between said surfaces.

4. The connector of claim 2 wherein said housing further includes two opposing surfaces therein with at least 3 substantially aligned members substantially perpendicular to said surfaces and extending between said surfaces with at least one of said members depending from each of said surfaces and at least two of said members depending from a first of said surfaces wherein a segment of each of said two conductive metallic strips is interposed and compressively held between the second of said surfaces and each of said members depending from the first of said surfaces respectively.

5. The connector of claim 4 wherein said second surface includes two depressed regions with said segments of said metallic strips being contained within said depressed regions respectively.

6. The connector of claim 4 wherein each of said metallic strips includes a flanged end with a cantilevered cutout with each of said conductive wires held between said cutouts and flanged ends respectively and wherein each of said flanged ends with conductive wire is positioned between and buttressed against a member depending from each of said surfaces and a member depending from one of said surfaces.

7. The connector of claim 1 wherein said resilient connection means comprises a circumferential skirt with beads on opposing portions of the inner surface of said skirt and wherein said holding means comprises beads on opposing sides of said battery with the beads on said connector and the beads on said battery being aligned whereby said connector beads snap over and are held by said battery beads.

8. The connector of claim 1 wherein said housing includes a portion thereof which extends beyond the plane of a side wall of said battery whereby said portion functions as a fulcrum in removing said connector from said battery.

9. The connector of claim 8 wherein said extending portion has an aperture therein with said conductive means extending through said aperture for electrical connection with said electrical device.

* * * * *